United States Patent Office 2,710,794
Patented June 14, 1955

2,710,794

DEFOLIATION OF GROWING PLANTS

Geoffrey Edwin Barnsley, Woodstock, Sittingbourne, England, assignor to Shell Development Company, Emeryville, Calif., a corporation of Delaware No Drawing. Application May 7, 1953,
Serial No. 353,669

20 Claims. (Cl. 71—2.6)

This invention relates to the defoliation of growing plants.

The importance and desirability of defoliating living plants is well known. The defoliation of cotton is of particular widespread economic importance, especially since the successful development of the mechanical cotton picker. This latter development has promoted much research in the field of artificial defoliation. Defoliation is also of interest, for example, with crops grown for seed, hops, and thorn bush in tsetse country.

According to the present invention, it has now been found that nitrosoureas, and particularly nitrosoureas having not more than about 10 carbon atoms per molecule, are especially effective for defoliating living plants.

The defoliating agents of the present invention are preferably those which satisfy the following general structural formula:

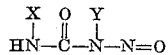

wherein X represents hydrogen, or a hydrocarbyl radical, preferably an alkyl or aryl radical, which hydrocarbyl radical may contain a polar group, such as —SO$_3$H, —COOH, —OH, —NH$_2$, and the like, and Y represents an alkyl or aralkyl radical. Preferably, the number of carbon atoms in the molecule should not exceed about 10. Particularly satisfactory results have been obtained with nitrosoureas of the above formula wherein X is a hydrogen atom and Y is an alkyl radical of 1 to 5 carbon atoms or an aralkyl radical of from 7 to 9 carbon atoms.

Examples of defoliating agents of the present invention include: N-nitroso, N-methyl urea; N-nitroso, N-ethyl urea; N-nitroso, N-isopropyl urea; N-nitroso, N-n-butyl urea; N-nitroso, N-isoamyl urea; N-nitroso, N-benzyl urea; the N-nitroso, N-tolyl ureas; the N-nitroso, N-xylyl ureas; N-nitroso, N,N'-dimethyl urea; N-nitroso, N-methyl, N'-ethyl urea; N-nitroso, N-benzyl, N'-methyl urea; N-nitroso, N-methyl, N'-phenyl urea; and the like.

The defoliating agents of the present invention can be employed either alone or in combination with other defoliating agents. The defoliant is preferably applied to the plants in a liquid carrier, for example, in an aqueous medium or in a hydrocarbon oil medium.

When the defoliant is applied in an aqueous carrier, it is desirable to add to the composition a surface-active agent in order to promote and maintain the dispersion of the nitrosourea in the aqueous carrier. Any of the well known surface-active agents can be employed, for example, alkali metal salts of long chain alkyl sulfates, alkali metal salts of alkyl aryl sulfonic acids, such as petroleum sulfonic acids, and dodecylbenzene sulfonic acid, polyethylene glycol ethers of alkyl phenols, and the like. Under conditions where it is desirable to employ aqueous sprays having a nitrosourea concentration higher than that of a saturated aqueous solution, a suitable co-solvent can be added to the spray to enhance the solubility of the nitrosourea in the aqueous medium. Suitable co-solvents include the organic water-soluble ketones and alcohols, such as ketones and alcohols of 2-4 carbon atoms per molecule, for example, acetone, methyl ethyl ketone, n-propyl alcohol, isopropyl alcohol, tertiary butyl alcohol, dioxane, and the like. The more water-soluble nitrosoureas, such as the nitrosoureas of the above formula in which X is a hydrocarbyl, particularly an aryl group, containing a water solubilizing group, such as a —SO$_3$H or a —COOH group, can also be used under circumstances where a relatively high concentration of the defoliant in the aqueous medium is desired.

Preferably, concentrate compositions comprising the defoliant of the present invention, a suitable surface-active agent and, if desired, a cosolvent, are prepared and the concentrate is then dispersed in water just prior to use.

The defoliant can also be applied in a non-aqueous medium, particularly a hydrocarbon oil medium. Non-aqueous media are preferred where compositions containing relatively high concentrations of the defoliant are desired, for example, in low-volume spraying from an airplane, or in areas where water is not readily available. The oil carriers in which the defoliants can be utilized are, for example, any of the normally used horticultural spray oils. For practical reasons these oils will usually be mineral oils, but oils of animal or vegetable origin or synthetic oils are also satisfactory. In general, the oils should be of a relatively bland, non-phytotoxic nature since any composition which would kill the plant outright could not promote the development of the abscission layers which is necessary to successful defoliation. In order to avoid objectionable staining of the plant fibers, oils with only a fairly light color should be used. Particularly useful are the relatively highly paraffinic (unsulfonatable residue greater than about 80 or 85%), such as mineral seal oil, kerosene, refined gas oils and very light lubricating oils, and the like. Various blends of such oils may be used in which may also be included varying amounts of lesser refined oils such as catalytically cracked gas oil fractions, light diesel oils, etc. For example, a blend of from about 60 to 70% of mineral seal oil, 20 to 30% kerosene, and about 10% of a catalytically cracked gas oil fraction is a very suitable carrier for the defoliants. In general, the oils should have a boiling range within the limits of about 300° F. and about 800° F., preferably between about 400° F. and about 700° F., and a maximum viscosity of about 90 SSU at 100° F., but preferably less than about 60 SSU at 100° F.

If necessary, a suitable cosolvent, such as acetone, isopropyl alcohol, and the like, can be added to promote solubility of the defoliant in the oil carrier.

The defoliants of the present invention can also be applied in oil-in-water emulsions. Hydrocarbon oils, such as those described above, are preferred in the formulation of emulsions. An emulsifying agent is generally added to promote emulsification. The type of emulsifier is not critical: cationic, anionic, or non-ionic emulsifiers can be employed. Suitable emulsifiers include fatty acid amides, quaternary ammonium compounds, alkali metal salts of oil-soluble alkyl aryl sulfonic acids, such as petroleum sulfonic acids, alkali metal salts of long chain alkyl sulfates, fatty acid esters of polyhydric alcohols, such as sorbitol, mannitol, and the like, polyalkylene glycol ethers of alkyl phenols, and many other well known emulsifiers. Preferably an emulsifiable concentrate composition comprising the defoliant, a hydrocarbon oil, a suitable emulsifying agent and, if desired, a cosolvent is prepared, and the concentrate is then dispersed in water just prior to use.

The amounts of the various compositions which it will be necessary to use will, of course, depend upon the degree of defoliation desired, the degree of maturity of the plants and, to a lesser extent, the particular carrier employed. For defoliation, where a maximum degree of leaf-drop is desired, the compositions will normally be applied at from about 3 to about 50 gallons per acre, preferably from about 5 to about 20 gallons per acre, of a composition containing between about 0.05% and about 1.5% by weight of the defoliant. The rate of distribution of the composition and the concentration of the defoliating agent in the composition should be correlated so that from about 0.1 to about 15 pounds of the defoliant are applied per acre.

The invention is illustrated by the following examples which should not be considered as limiting the invention or the claims thereto in any manner.

EXAMPLE I

Various plants, as shown in Table I, were sprayed with a solution of N-nitroso, N-methyl urea in water to which 2–30% by weight of acetone had been added as a cosolvent in order to obtain the desired degree of solubility. The plants were sprayed to full coverage of the leaves. Solutions having varying concentrations of the defoliant were tested. The results are given in Table I.

Table I

| Test Plant | Percent Defoliation | | |
|---|---|---|---|
| | Concentration of N-nitroso, N-methyl Urea in Percent by Weight | | |
| | 0.5 | 1.0 | 1.5 |
| Solanum capsicum (pepper) | 57 | 100 | 100 |
| Phaseolus vulgaris (kidney bean) | 100 | 100 | |
| Apple (Varieties, Cox, Worcester, Lane's Prince Albert) | 100 | 50 | |
| Cherry (Variety Ohio Beauty) | 80 | 91 | |
| Cotton Plant (Gossipium Tennessee) | 75 | 56 | |
| Peach (Rochester and Peregrine Varieties) | 40 | 100 | |

It will be noted that, in the case of apple trees, an optimum was reached at a concentration of 0.5% by weight of the defoliant. At higher concentrations the leaves are damaged to such an extent that no abscission layers are formed and the desired defoliation does not occur.

EXAMPLE II

N-nitroso, N-methyl urea was applied in a gas oil emulsion at concentrations of 0.5%, 1.0% and 1.5% by weight to *Solanum capsicum* to full coverage of the leaves. The spray was obtained by emulsifying in water a composition consisting of 4.0% by weight of N-nitroso, N-methyl urea in a blend of 45% by volume of acetone, 28% by volume of gas oil, 25% by volume of isopropyl alcohol and 2.0% by volume of a polyethylene glycol ether of an alkyl phenol which is sold under the trade name of Triton X-100. After 11 days, the per cent defoliation was 90.0%, 98.1% and 91.7% at concentrations of the defoliant of 0.5%, 1.0% and 1.5% by weight, respectively.

I claim as my invention:

1. A method of defoliating living plants which comprises applying to the leaves of said plants an effecting defoliating amount of a composition containing N-nitroso, N-methyl urea as active defoliant.

2. A method of defoliating living plants which comprises applying to the leaves of said plants a composition containing an N-nitroso, N-alkyl urea in which the alkyl group contains from 1 to 5 carbon atoms.

3. A method of defoliating living plants which comprises applying to the leaves of said plants a composition containing an N-nitroso, N-aralkyl urea in which the aralkyl group contains from 7 to 9 carbon atoms.

4. A method of defoliating living plants which comprises applying to the leaves of said plants a composition containing a nitrosourea having the general formula

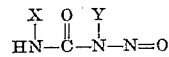

wherein X is selected from the group consisting of hydrogen and hydrocarbyl radicals and Y is selected from the group consisting of alkyl and aralkyl radicals, and said nitrosourea having not more than 10 carbon atoms per molecule.

5. A method of defoliating living plants which comprises applying to the leaves of said plants a composition containing a nitrosourea having the general formula

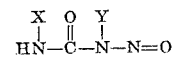

wherein X is selected from the group consisting of hydrogen and hydrocarbyl radicals and Y is selected from from the group consisting of alkyl and aralkyl radicals.

6. The method according to claim 5, wherein the nitrosourea is an N-nitroso, N-alkyl urea.

7. The method according to claim 5, wherein the nitrosourea is an N-nitroso, N-aralkyl urea.

8. A composition suitable for defoliating living plants comprising N-nitroso, N-methyl urea and a surface-active agent in an aqueous medium.

9. A composition suitable for defoliating living plants comprising N-nitroso, N-methyl urea, a surface-active agent and a cosolvent for said N-nitroso, N-methyl urea in an aqueous medium.

10. A composition suitable for defoliating living plants comprising an N-nitroso, N-alkyl urea and a surface-active agent in an aqueous medium.

11. A composition suitable for defoliating living plants comprising an N-nitroso, N-aralkyl urea and a surface-active agent in an aqueous medium.

12. A composition suitable for defoliating living plants comprising a nitrosourea having the general formula

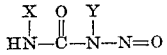

wherein X is selected from the group consisting of hydrogen and hydrocarbyl radicals and Y is selected from the group consisting of alkyl and aralkyl radicals and a surface-active agent in an aqueous medium.

13. A composition suitable for defoliating living plants comprising a nitrosourea having the general formula

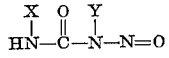

wherein X is selected from the group consisting of hydrogen and hydrocarbyl radicals and Y is selected from the group consisting of alkyl and aralkyl radicals, a surface-active agent, and a cosolvent for said nitrosourea and water in an aqueous medium.

14. A defoliant concentrate composition comprising N-nitroso, N-methyl urea and a surface-active agent suitable for dispersing said composition in water.

15. A defoliant concentrate composition comprising N-nitroso, N-methyl urea, a cosolvent for N-nitroso, N-methyl urea and water, and a surface-active agent suitable for dispersing said composition in water.

16. A defoliant concentrate composition comprising an N-nitroso, N-alkyl urea and a surface-active agent suitable for dispersing said composition in water.

17. A defoliant concentrate composition comprising an N-nitroso, N-aralkyl urea and a surface-active agent suitable for dispersing said composition in water.

18. A defoliant concentrate composition comprising a nitrosourea having the general formula

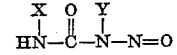

wherein X is selected from the group consisting of hydrogen and hydrocarbyl radicals and Y is selected from the group consisting of alkyl and aralkyl radicals and a surface-active agent suitable for dispersing said composition in water.

19. A defoliant concentrate composition comprising a nitrosourea having the general formula

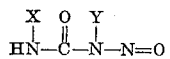

wherein X is selected from the group consisting of hydrogen and hydrocarbyl radicals and Y is selected from the group consisting of alkyl and aralkyl radicals, a co-solvent for said nitrosourea and water, and a surface-active agent suitable for dispersing said composition in water.

20. A composition according to claim 19, wherein said nitrosourea contains not more than 10 carbon atoms per molecule.

References Cited in the file of this patent

UNITED STATES PATENTS

| | | |
|---|---|---|
| 2,054,509 | Pastac | Sept. 15, 1936 |
| 2,668,758 | Ross et al. | Feb. 9, 1954 |